United States Patent
Schäfer et al.

[11] Patent Number: 5,433,667
[45] Date of Patent: Jul. 18, 1995

[54] CENTERED DOUBLE CARDAN JOINT FOR STEERING SHAFTS IN MOTOR VEHICLES

[75] Inventors: Burkhard Schäfer, Lemförde; Berthold Grosse-Kohorst; Hans Hucklenbroich, both of Lohne, all of Germany

[73] Assignee: Lemforder Metallwaren AG, Lemforde, Germany

[21] Appl. No.: 25,968

[22] Filed: Mar. 3, 1993

[30] Foreign Application Priority Data

Mar. 7, 1992 [DE] Germany .................. 42 07 218.2

[51] Int. Cl.⁶ .................................................. F16D 3/33
[52] U.S. Cl. .................................. 464/118; 464/125
[58] Field of Search ............... 464/114, 117, 118, 125, 464/128, 130, 147

[56] References Cited

U.S. PATENT DOCUMENTS

| | | | |
|---|---|---|---|
| 1,898,265 | 2/1933 | Ragan | 464/125 |
| 2,271,974 | 2/1942 | Greiner | 464/125 |
| 3,064,453 | 11/1962 | Barsness et al. | 464/125 |
| 3,159,013 | 12/1964 | Mazziotti | 464/118 |
| 3,461,688 | 8/1969 | Garfinkle | 464/125 |
| 4,121,437 | 10/1978 | Michel | 464/125 X |
| 4,436,515 | 3/1984 | Mallet | 464/114 |
| 5,094,654 | 3/1992 | Cornay | 463/117 X |

FOREIGN PATENT DOCUMENTS

3921242C1 6/1990 Germany .

Primary Examiner—Daniel P. Stodola
Assistant Examiner—Eileen A. Dunn
Attorney, Agent, or Firm—McGlew and Tuttle

[57] ABSTRACT

A centered double cardan joint for steering shafts in motor vehicles, in which the shaft ends (1, 2), which are nonrotatably connected to one another in the joint, are mounted movably in a universal joint around two articulated axes that enclose a right angle with one another and with the longitudinal axis of the shaft in a housing, which connects the two universal joints to one another, by journals (5 through 8 and 10 through 13). To make it possible to manufacture a joint that eliminates vibrations at low cost, each of the two universal joints is provided in a ring (3, 4), which surrounds the corresponding shaft end (1, 2) at a radially spaced location, and in which the shaft end (1, 2) is mounted movably around the journals (5 through 8) arranged in one articulated axis, and which is mounted movably in a housing made of a pipe section (9) by journals arranged in the other articulated axis.

5 Claims, 3 Drawing Sheets

CENTERED DOUBLE CARDAN JOINT FOR STEERING SHAFTS IN MOTOR VEHICLES

FIELD OF THE INVENTION

The present invention pertains to a double cardan joint for steering shafts in motor vehicles and more particularly to a centered double cardan joint for steering shafts in motor vehicles in which the shaft ends, non rotatably connected to one another in the joint, are each mounted by means of bearing journals movably around two articulated axles, which enclose a right angle with one another and with the longitudinal axis of the shaft, in a housing, which connects the two universal joints to one another.

BACKGROUND OF THE INVENTION

Similar features are known from DE 3,921,242 C1. In this prior-art design, one of two universal joints is connected, movably around one of the universal joint axles, to a fork at one of the two shaft ends and, around the other articulated axle, to a fork at a connecting flange. The central centering is ensured by a hinge joint of the two shaft ends within the connecting flange consisting of a metallic spherical part at one shaft end and of a cylindrical, likewise metallic housing at the other shaft end, with which the spherical part of the universal joint engages without radial clearance, but in an axially movable manner. The connecting flange and the two forks provided thereon are made of metal in one piece, and an inner hollow space provides the free space for the movement of the centering hinge joint, and its size is adjusted to the maximum angular deflection of the two shaft ends relative to the extended center line. To achieve smoother running, the ends of the two universal joints are mounted in antifriction beatings in holes of the fork arms. Lubricant can be supplied to the bearings via lubricant ducts. Such a double cardan joint with central centering has also become known from French Patent No. FR 24,02,803.

French Patent Application No. FR 82,07,571 discloses a centered double cardan joint, in which the connecting flange, on which one set of fork-type joints is provided, consists of two sleeves, which are arranged concentrically one inside the other, and an elastic insert, by which the two sleeves are nonrotatably connected to one another, so that this elastic insert, made of plastic or another elastomer, isolates the other shaft end from vibrations.

SUMMARY AND OBJECTS OF THE INVENTION

It is an object of the present invention to provide an inexpensive, easy-to-mount design of a centered double cardan joint, which can preferably be provided with an optimized vibration absorber to eliminate vibrations between the two shaft ends and to reduce the structure-borne noise in the inner space of a motor vehicle.

According to the invention, two shaft ends are non rotatably connected to one another in the joint and are mounted, by means of bearing journals, movably around two articulated axes, the axes enclose a right angle with one another and with the longitudinal axis of the shaft. A housing is provided which connects the two universal joints with one another. Each of the two universal joints is provided in a ring and surrounds the corresponding shaft end at a radially spaced location. The shaft end is mounted in the corresponding ring movably around the journal arranged with an articulated axis and which is mounted movably in a housing formed of a pipe section by means of journals arranged with the other articulated axis. The journals are inserted into bearing bushings by means of anti friction bearings and are at least partially surrounded by elastic material.

As a result, mainly the manufacture of the cardan joint is substantially simplified, and the installation of effective vibration absorption means is facilitated. The new double cardan joint consists essentially of two rings connected by coaxially arranged journals to one of the two shaft ends and of a pipe section overlapping both rings, to which the rings are also connected by two coaxially arranged journals each. All these bearing journals can easily be inserted during assembly radially from the outside through holes of rings and of the pipe section, and thus they permit easy and rapid mounting, but also the easy installation of absorption means for eliminating vibrations.

To achieve this, a preferred variant of the present invention provides for the journals being inserted in bearing bushes made of an elastic material by means of antifriction bearings, and the bearing bushes being inserted into the holes of the rings and of the pipe section.

The journals are preferably mounted in a radial hole of the respective outer part by means of needles bearings or anti friction bearings inserted into a bearing bush. The journals are rigidly arranged in a respective inner part and are inserted through a radial hole of the outer part which surrounds the inner part. The two journals connecting the ring to the shaft end may be formed as a continuous bolt. A central centering means formed of a ball joint including a spherical part attached to one shaft end and a shell-type housing attached to the other shaft end is provided wherein the spherical part is mounted in a lining made of elastic material which is arranged in the shell type housing. The radially extending holes of the pipe section forming the housing are preferably covered by an attached cuff.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
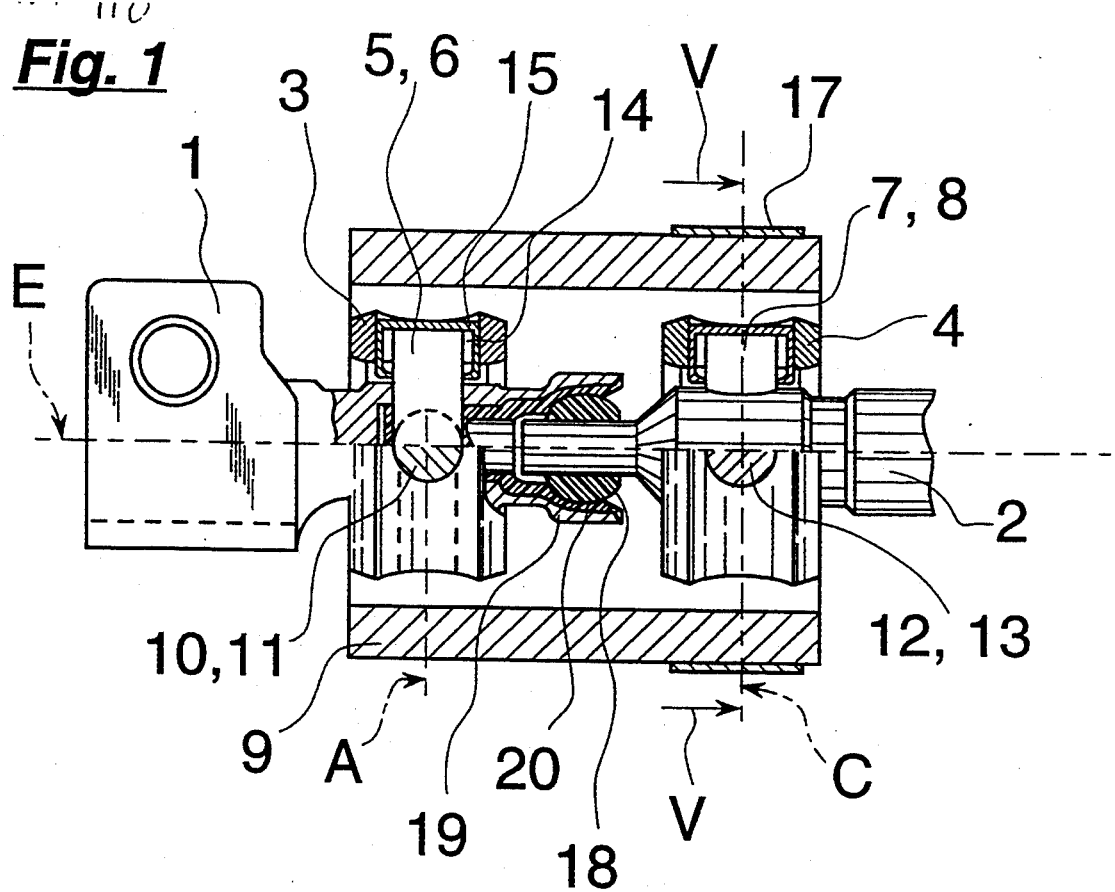
FIG. 1 is a longitudinal sectional view through the extended joint in an axial plane.
Figure 3:
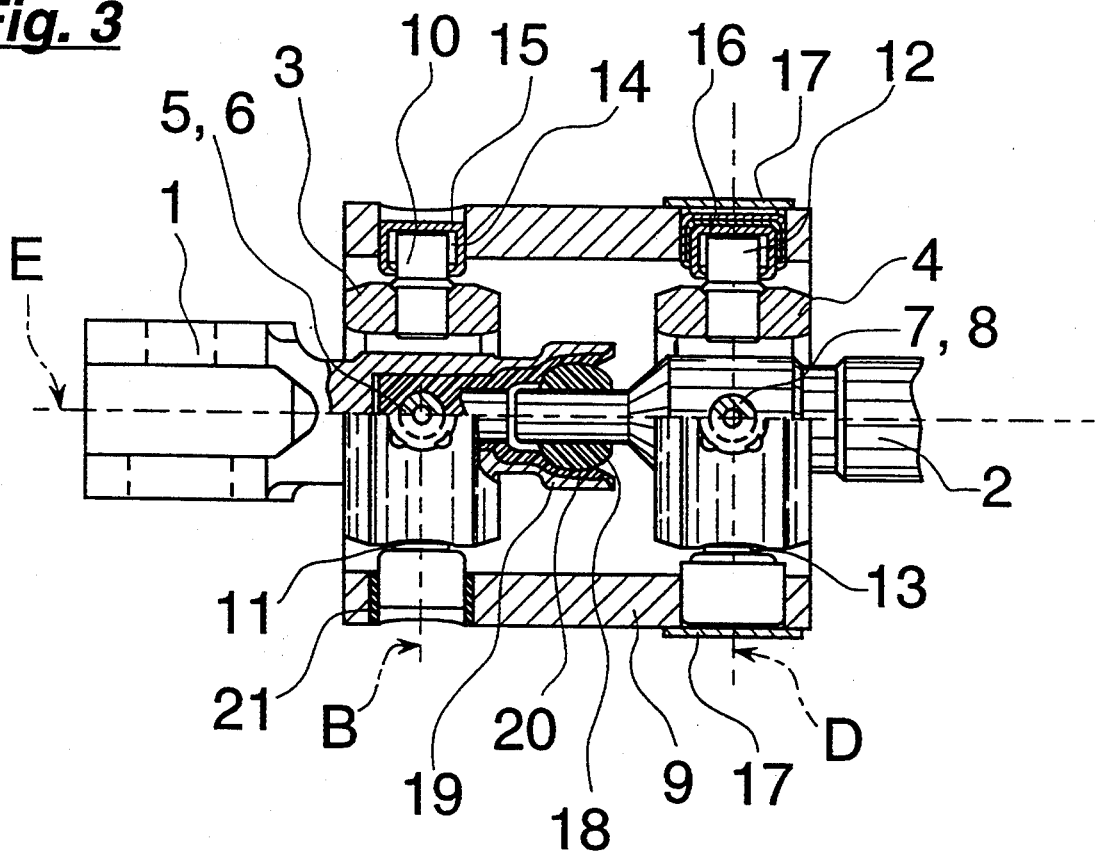
FIG. 3 is a longitudinal sectional view rotated by 900 relative to FIG. 1.
Figure 4:
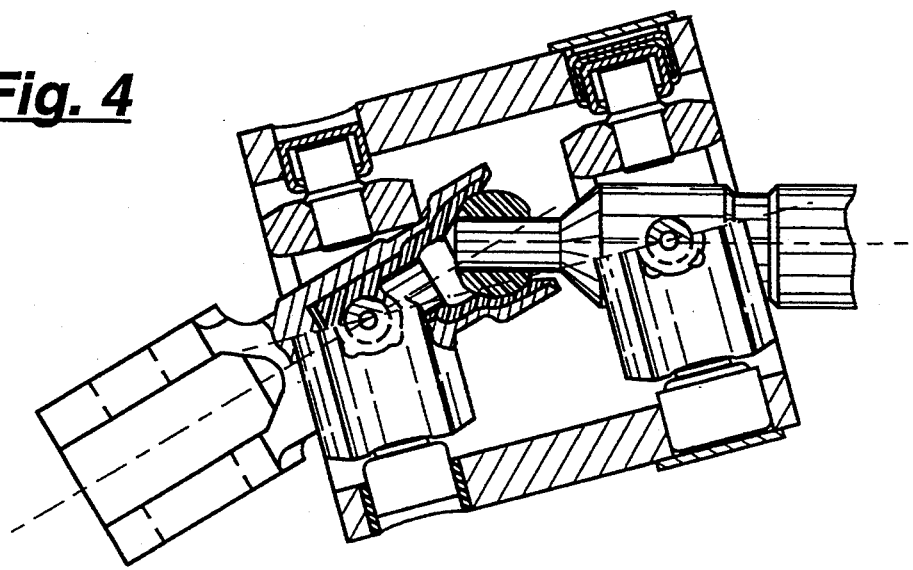
FIG. 4 is a sectional view corresponding to FIG. 3 of a buckled joint.
Figure 5:
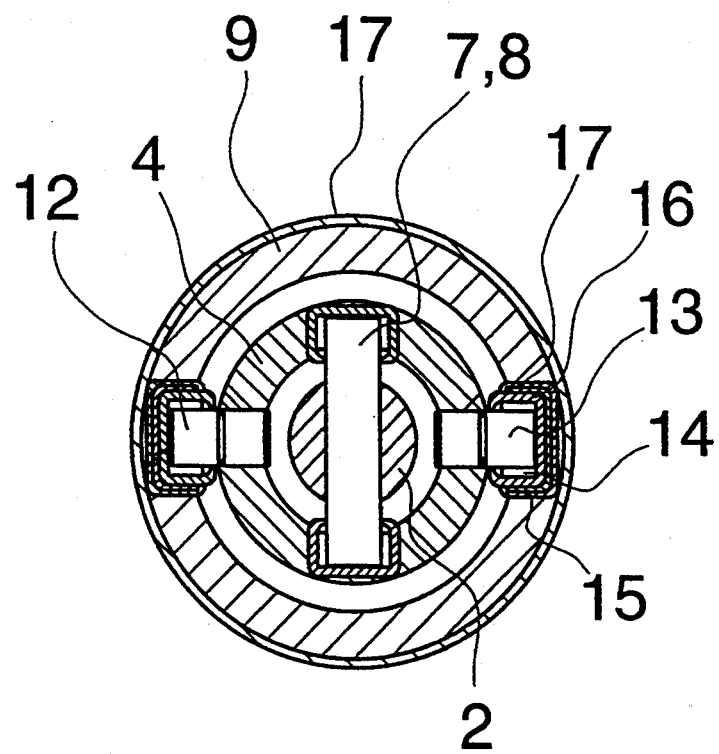
FIG. 5 is a sectional view along line V—V in FIG. 1.

In the double cardan joint according to the present invention, the ends of the two shaft ends to be connected to one another via the joint may be designed without fork-type joints, e.g., in the form of a journal. Both shaft ends 1 and 2 engage, with a considerable radial clearance, a respective ring 3 or 4 The shaft ends 1 and 2 are nonrotatably connected to the respective rings 3, 4 at two diametrically opposed points by two journals 5 and 6 arranged coaxially in the articulated axle A of one of the universal joints, or by two journals 7 and 8 arranged coaxially in the articulated axle C of the other universal joint. The journals 5 and 6 as well as 7 and 8 may also be designed as continuous bolts. Both the rings 3 and 4 are inserted into the ends of a pipe section 9 forming a housing. The rings 3 and 4 are nonrotatably connected to the pipe section 9, corresponding to the representation in FIGS. 3 and 4, likewise at two diametrically opposed points, by two journals 10 and 11 arranged coaxially in the second articulated axle B of one of the universal joints, and by two journals 12 and 13 arranged coaxially in the second articulated axle D of the other universal joint, wherein the articulated axles A and B as well as C and D (FIGS. 1 and 3) of each universal joint enclose a right angle with one another and with the extended longitudinal axis E of the double cardan joint. All the journals 5 through 8 and 10 through 13 are mounted by means of antifriction bearings 14, especially needle bearings, in a bearing bush 15, which are inserted radially from the outside into the corresponding hole in the rings 3 and 4 and in the pipe section 9 during mounting, as a result of which mounting is considerably simplified. At least two of the bearing bushes 15 inserted into radial holes of the pipe section 9 are arranged in the exemplary embodiment in pot-shaped mounting bushes 16. Pot shaped mounting bushes 16 are inserted into the hole in the pipe section 9, and are held by a cuff 17 with internal stress or with clamping means (not shown). Such a mounting may be equally provided at all bearings. As a deviation from this, the bearing bushes 15 of the rolling bearings 14 may also consist of an elastic material 21, especially if high bearing loads are not to be expected.

Figure 2:
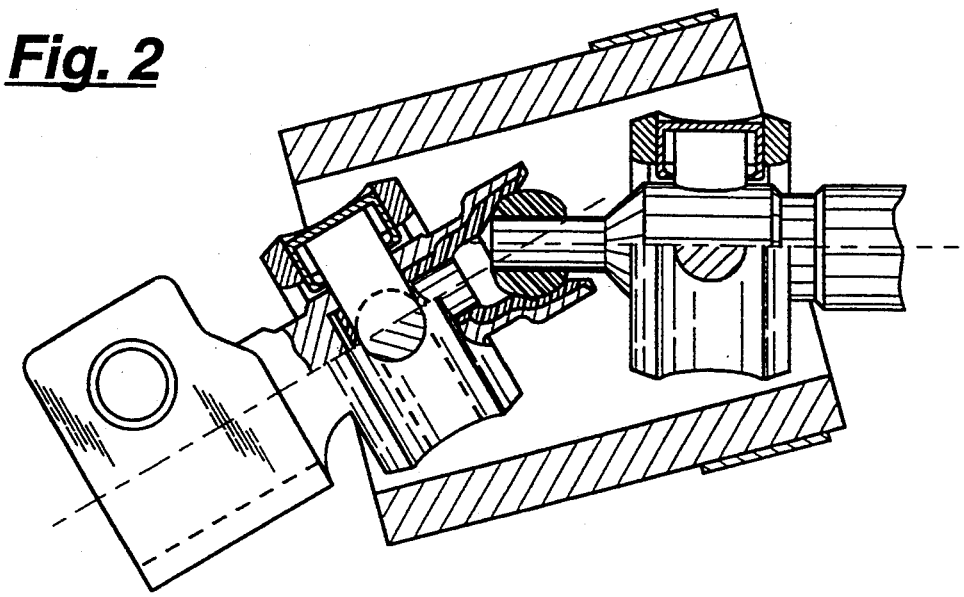
FIG. 2 is a sectional view as in FIG. 1 but showing a buckled joint.

The centering of the double cardan joint is performed in the known manner by means of a connecting joint consisting of a spherical part 18 made of plastic, which is connected to one shaft end 2 within the pipe section 9, and which engages a shell-type housing 19 at the other shaft end 1. The shell-type housing 19 also has a lining 20 made of an elastic plastic, so that no vibrations will be transmitted from one shaft end to the other shaft end. As shown in tile drawings, the spherical part. 18 is axially movable on the shaft end 2. When the shaft ends 1 and 2 are at an angle as in FIGS. 2 and 4, the spherical part: 18 is positioned at the far end of tile shaft end 2. When the shaft ends 1 and 2 are in line as in FIGS. 1 and 3, the spherical part 18 is slid further in on shaft end 2. The spherical part 18 is slidable on shaft end 2 to compensate for change in distance between the two shaft ends 1 and 2 when the angle between the two shaft ends changes.

While a specific embodiment of the invention has been shown and described in detail to illustrate the application of the principles of the invention, it will be understood that the invention may be embodied otherwise without departing from such principles.

What is claimed is:

1. A centered double cardan joint for steering shafts and motor vehicles, comprising:
   a first shaft end and a second shaft end;
   a first ring surrounding said first shaft end;
   a second ring surrounding said second shaft end, said rings each being radially spaced from corresponding shaft ends;
   first journal means for connecting said first shaft end to said first ring whereby said first shaft end is movably connected to said first journal means about a first articulated axis;
   second journal means for connecting said second shaft end to said second ring whereby said second shaft end is movably connected to said second journal means about a second articulated axis;
   a pipe section surrounding said first ring and said second ring;
   first additional journal means for movably connecting said first ring in said pipe section, said first additional journal means being arranged about a first additional articulated axis at a first end of said pipe section; and
   second additional journal means for movably connecting said second ring in said pipe section, said second additional journal being arranged about a second additional articulated axis at a second end of said pipe section;
   said first ring defines a plurality of holes:
   said first journal means includes a journal insertable through one of said plurality of holes in said first ring and rigidly attachable to said first shaft end;
   said pipe section defines a plurality of holes;
   said first additional journal means includes a journal insertable through one of said plurality of holes in said pipe section and rigidly attachable to said first ring;
   said second ring defines a plurality of holes;
   said second journal means includes a journal insertable through one of said plurality of holes in said second ring and rigidly attachable to said second shaft end;
   said second additional journal means includes a journal insertable through one of said plurality of holes in said pipe section and rigidly attachable to said second ring;
   each of said first journal means, said first additional journal means, second journal means and second additional journal means includes bearings positioned at each end of a respective said journal, a bearing bush positioned around said bearings, said bearing bush being formed of an elastic material, a pot-shaped mounting bush positioned around said bearing bush and said pot-shaped mounting bush also being positioned in one of said plurality of holes in respective said first ring, second ring and pipe section;
   a centering means for centering an angle between said first shaft end and said second shaft end, said centering means including a spherical part connected to said first shaft end and a shell-type housing connected to said second shaft end, said spherical part being insertable into said shell-type housing and movable on said first shaft end in an axial direction of said first shaft end, said shell-type housing having a lining made of an elastic plastic.

2. A double cardan joint according to claim 1, wherein:
   each of said first journal means, said second journal means, said first additional journal means and said second additional journal means are mounted in a radial hole by means of said bearings inserted into said bearing bush.

3. A double cardan joint according to claim 1, wherein: one of said first journal means and said second journal means are each formed by a continuous bolt.

4. A double cardan joint according to claim 1, wherein:
one of said holes of said pipe section is covered by an attached cuff.

5. A centered double cardan joint for steering shafts and motor vehicles, comprising:
a first shaft end and a second shaft end;
a first ring surrounding said first shaft end:
a second ring surrounding said second shaft end, said rings each being radially spaced from corresponding shaft ends;
first journal means for connecting said first shaft end to said first ring whereby said first shaft end is movably connected to said first ring and about a first articulated axis;
second journal means for connecting said second shaft end to said second ring whereby said second shaft end is connected movably to said second ring and about a second articulated axis;
a pipe section surrounding said first ring and said second ring;
first additional journal means for movably connecting said first ring in said pipe section, said first additional journal means being arranged about a first additional articulated axis at a first end of said pipe section; and
second additional journal means for movably connecting said second ring in said pipe section, said second additional journal being arranged about a second additional articulated axis at a second end of said pipe section
one of said first journal means, said second journal means, said first additional journal means and said second additional journal means include bearing bushings with antifriction bearings that are at least partially surrounded by elastic material;
a centering means for centering an angle between said first shaft end and said second shaft end, said centering means including a spherical part connected to said first shaft end and a shell-type housing connected to said second shaft end, said spherical part being insertable into said shell-type housing and movable on said first shaft end in an axial direction of said first shaft end, said shell-type housing having a lining made of an elastic plastic.

* * * * *